Jan. 13, 1953     A. FERRERA     2,624,976
HOOD ORNAMENT
Filed July 1, 1950
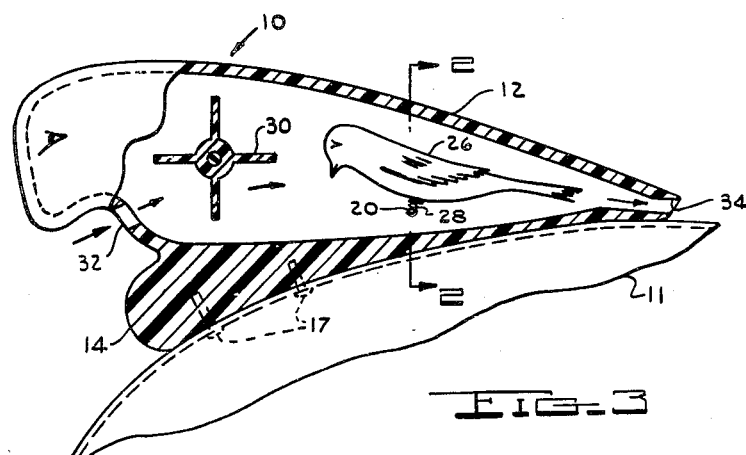
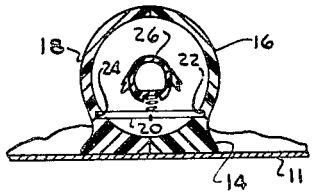
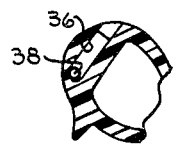
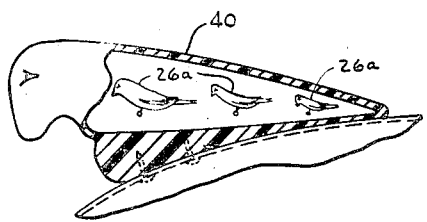
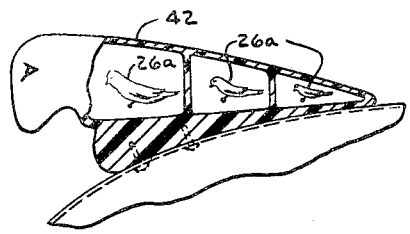
INVENTOR.
ANTHONY FERRERA
BY
Arthur M. Smith
ATTORNEY Patented Jan. 13, 1953

2,624,976

UNITED STATES PATENT OFFICE 2,624,976

HOOD ORNAMENT

Anthony Ferrera, Dearborn, Mich., assignor of one-half to Joicaomo Scappaticci, Wayne County, Mich.

Application July 1, 1950, Serial No. 171,597

3 Claims. (Cl. 46—124)

The present invention relates to a hood ornament for a motor vehicle, and more particularly to a device adapted to be mounted on the hood of a motor vehicle, and which device includes elements adapted to be actuated when the motor vehicle is in motion.

It is an abject of the present invention to provide a device adapted to be mounted on the hood of a motor vehicle, and which device includes a transparent protective housing within which is resiliently mounted an animated bird, or the like, to permit said bird, or the like, to be actuated when the motor vehicle is in motion.

It is another object of the present invention to provide a device adapted to be mounted on the hood of a motor vehicle, and which device includes a transparent protective housing within which is rotatably mounted a paddle wheel, said housing being apertured to provide a stream of air therethrough when the motor vehicle is in operation, whereby the paddle wheel will be rotated.

It is still another object of the present invention to provide an article of manufacture to be used as an adornment for hoods of motor vehicles and which article of manufacture is characterized by its simple construction and few parts so that it can be economically manufactured and sold and which will be durable in use to afford a continuously operating animated hood ornament.

Other objects of this invention will appear in the following description and appended claims, reference being had to the accompanying drawings forming a part of this specification wherein like reference characters designate corresponding parts in the several views.

In the drawings:

Fig. 1 is a longitudinal view partly in section of one modification of the present hood ornament mounted on a fragmentary portion of the hood of a motor vehicle;

Fig. 2 is a sectional view taken on the line 2—2 of Fig. 1;

Fig. 3 is a fragmentary sectional view of the head of one of the animated birds showing an arrangement for providing additional actuation of the bird; and Figs. 4 and 5 are fragmentary sectional views of other modified forms of the present hood ornament shown mounted on fragmentary portions of motor vehicles.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly to Fig. 1, a hood ornament 10 is shown mounted on the hood 11 of a motor vehicle. The hood ornament 10 has a housing 12 with which is integrally formed a base portion 14 which is adapted to receive screws 17 or the like, for securing the ornament to the hood 11. The housing 12 is made of any suitable transparent plastic material, and is formed from two longitudinal sections 16 and 18, as can be seen in Fig. 2.

A perch bar 20 is positioned within the housing 12 and has its ends extending into recesses 22 and 24 formed in the longitudinal sections 16 and 18. The perch bar 20 may be held in any suitable manner in the recesses 22 and 24 so as to prevent rotation of the perch bar 20 relative to the sections 16 and 18.

A bird-like figure 26 is contained within the housing 12 and is perched on the perch bar 20. The mounting means for mounting the bird-like figure 26 on the perch bar 20 consists of a coil spring 28 secured to the bird-like figure 26 by any suitable means and which is secured to the perch bar 20 so as to prevent rotation of said coil spring about the perch bar 20.

Also contained within the housing 12 is a paddle wheel 30 which is suitably mounted between the sections 16 and 18, so as to permit spinning of the wheel 30 with respect to the housing 12.

The housing 12 has apertures 32 and 34 formed therein to permit a stream of air to be directed through the housing against the paddle wheel when the vehicle is in motion. Thus, it can be seen that the wheel will be caused to spin whenever the vehicle is in motion.

It is preferred that the apertures 32 and 34 be formed in the underside of the housing 12 so that rain water and the like will not collect within the housing 12. It should be noted that the aperture 34, which is adjacent the hood 11, is spaced thereabove so as to prevent water from running down the hood 11 and into the housing 12 to accumulate therein.

From the above description, it will be seen that a hood ornament has been provided which contains an animated bird-like figure 26 as well as a paddle wheel 30 adapted to be spung when the vehicle is in motion. As can be seen, the birdlike figure 26 is resiliently mounted so that when the vehicle is in motion, said birdlike figure will be in constant movement.

Referring to Fig. 3, a fragmentary sectional view is shown of a head of a bird of the type mounted within the housing 12. As shown, a slot 36 is provided therein within which is contained a metal ball 38 which is movable within said slot 36. This internal structure of the head of the bird-like figure 26 may be used where it is desired to further accentuate the movements of said bird-like figure 26 when the motor vehicle is under way. It is believed to be readily understood that this will occur, since it can be seen that as the bird-like figure 26 is caused to be moved, the ball 38 will oscillate in the slot 36, thereby causing the movements of the head of the bird-like figure to be accentuated.

The hood ornament of the present invention is preferably made from any suitable plastic material. The paddle wheel 30 and the bird-like figure 26 can be colored in any desired manner so as to provide the most attractive appearance. The housing 12, likewise, can be colored in any suitable manner, but it is intended that the sides of the housing 12 remain transparent so that the paddle wheel 30 and the bird-like figure 26 will be visible from the exterior of the housing 12. It should be understood that the present invention is not limited to the use of a bird-like figure 26, but is intended to include a transparent housing within which can be mounted any body member simulating a running dog, such as a greyhound or any other form of animal.

Referring to Figs. 4 and 5, two other modifications of the present invention can be seen. In Fig. 4, a housing 40 is shown within which is mounted a plurality of bird-like figures 26a. These bird-like figures are constructed and arranged substantially the same as the bird-like figure 26 shown in the modification of Fig. 1.

Fig. 5 shows a modification wherein the housing 42 provides separate compartments for the bird-like figures 26a. It is within the contemplation of the present invention to provide any number of animated objects within the transparent housing of the hood ornament. Also, if desired, each of these may be placed in a separate compartment within the housing.

From the above description, it can be seen that an article of manufacture has been provided for use as a hood ornament of a motor vehicle. This hood ornament is characterized by its simplicity of construction and relatively few parts so that it can be economically manufactured and sold. This is believed to be apparent, since the housing 12 is made from two longitudinal sections 16 and 18 which can be easily assembled together and held together by a suitable plastic cement or glue. A plastic bird-like figure 26 and paddle wheel 30 can be easily assembled within the housing 12, merely by clamping the perch 20 and the axle of the paddle wheel 30 between the opposite sides of the sections 16 and 18 during the assembly operation.

When it is desired to employ a metal ball or the like for further accentuating movement of the bird-like figure 26, as is shown in the construction of Fig. 3, such bird-like figure can be readily assembled merely by forming the bird-like figure of two half sections forming a slot 36 therebetween. The metallic ball 38 can be inserted in the slot 36 and the two half sections may then be suitably glued or cemented together.

It can also be seen that the present hood ornament can be made from a relatively inexpensive rust-free material which will not be injured by exposure to the weather. Thus, a relatively long life can be expected from this animated hood ornament.

Having thus described my invention, I claim:

1. A device adapted to be mounted on the hood of a motor vehicle comprising an elongated hollow transparent housing, means for securing said housing to the hood of a motor vehicle, a perch member positioned within said housing transversely of the longitudinal axis thereof, a body member simulating a bird or the like resiliently mounted on said perch member, said housing having apertures in the longitudinal ends thereof for directing a stream of air against said body for actuating the same when the motor vehicle is in motion, a paddle wheel mounted with its axle transverse of said housing and with its paddles between said apertures in the path of said stream of air so as to cause irregular flow of air against said body member thereby causing greater actuation of said body member.

2. A device as claimed in claim 1 wherein said body member has a movable weight eccentrically located therein to effect additional actuation of said body member.

3. A device adapted to be mounted on the hood of a motor vehicle comprising an elongated hollow transparent housing, means for securing said housing to the hood of a motor vehicle, a perch member positioned within said housing transversely of the longitudinal axis thereof, a body member simulating a bird or the like resiliently mounted on said perch member, said housing having apertures in the longitudinal ends thereof for directing a stream of air against said body for actuating the same when the motor vehicle is in motion, said body member having a movable weight eccentrically located therein to effect additional actuation of said body member.

ANTHONY FERRERA.

REFERENCES CITED

The following references are of record in the file of this patent:

UNITED STATES PATENTS

| Number | Name | Date |
|---|---|---|
| 871,399 | Green | Nov. 19, 1907 |
| 874,526 | McLaughlin et al. | Dec. 24, 1907 |
| 1,647,902 | Cohn | Nov. 1, 1927 |
| 1,652,775 | Funk et al. | Dec. 13, 1927 |
| 2,484,343 | Hawes | Oct. 11, 1949 |

FOREIGN PATENTS

| Number | Country | Date |
|---|---|---|
| 691,018 | France | July 1, 1930 |